(12) United States Patent
Okada et al.

(10) Patent No.: US 6,279,552 B1
(45) Date of Patent: Aug. 28, 2001

(54) EXHAUST GAS RE-CIRCULATION VALVE

(75) Inventors: Hidetoshi Okada; Sotsuo Miyoshi; Toshihiko Miyake; Shinichi Kawasaki, all of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/402,237

(22) PCT Filed: May 27, 1998

(86) PCT No.: PCT/JP98/02338
§ 371 Date: Oct. 1, 1999
§ 102(e) Date: Oct. 1, 1999

(87) PCT Pub. No.: WO99/61775
PCT Pub. Date: Dec. 2, 1999

(51) Int. Cl.[7] .................................................. F02M 25/07
(52) U.S. Cl. ..................................... 123/568.2; 123/568.29
(58) Field of Search .......................... 123/568.11, 568.12, 123/568.18, 568.19, 56.2, 568.21, 568.23, 568.24, 568.26, 568.29

(56) References Cited

U.S. PATENT DOCUMENTS

| | | | |
|---|---|---|---|
| 3,799,131 | * 3/1974 | Bolton | 123/568.29 |
| 4,278,063 | * 7/1981 | Nakamura et al. | 123/568.2 |
| 4,350,013 | * 9/1982 | Yoshiba | 123/568.2 |
| 5,927,257 | * 7/1999 | Hackett | 123/568.26 |
| 6,006,732 | * 12/1999 | Oleksiewicz | 123/568.2 |
| 6,047,690 | * 4/2000 | Field et al. | 123/568.2 |

FOREIGN PATENT DOCUMENTS

| | | |
|---|---|---|
| 1203646 | 8/1989 | (JP) . |
| 6147025 | 5/1994 | (JP) . |
| 9-72250 | 3/1997 | (JP) . |
| 9-88733 | 3/1997 | (JP) . |
| 9189364 | 7/1997 | (JP) . |

* cited by examiner

Primary Examiner—Willis R. Wolfe

(57) ABSTRACT

An exhaust gas re-circulation valve which allows the accurate control of high temperature and pressure exhaust gas flowing through the engine exhaust gas re-circulation passage of a turbo diesel vehicle or the like. Valve seats 28, 29, valves 31, 32 and a valve shaft are mounted on a valve housing 21 and an adjustable adjusting mechanism 36,51, 28b,71 is provided which allows both the first valve 31 and the first valve seat 28 and the second valve 32 and the second valve seat 29 to close in abutment by displacement or deformation. In this way even if there is an irregularity in the process or assembly accuracy of the components of the exhaust gas re-circulation valve, it can be absorbed by the adjustable mechanism 36, 51, 28b, 71. As a result the formation of gaps between the valve and the valve seat as a result of irregularities in the in the process or assembly accuracy of the components of the exhaust gas re-circulation valve can be prevented and valve accuracy can be improved.

22 Claims, 10 Drawing Sheets

(a)

(b)

(a)

φC < φD (b)

EXHAUST GAS RE-CIRCULATION VALVE

FIELD OF THE INVENTION

The present invention is related to a exhaust gas re-circulation valve disposed in exhaust gas re-circulation passages of internal combustion gasoline or diesel engines for the purpose of returning engine exhaust gas back to the combustion chamber of the engine.

BACKGROUND ART

FIG. 1 is a cross section showing the layout of an EGR valve (exhaust gas re-circulation valve) as disclosed for example in JP-A-6/147025. In the figure, reference numeral 1 represents the valve housing (valve body), 1a is a first port allowing inflow of engine exhaust gas, 1b is a second port allowing inflow of said exhaust gas, 1c is a third port allowing the outflow of exhaust gas inflowing from the first and second ports 1a and 1b, 2 is a valve shaft, 3 and 4 are two valves formed as a unit and secured to the valve shaft 2, 5 is a diaphragm connected to the valve shaft 2, 6 is a set spring tensioning the diaphragm 5 on the valve shaft side 2 (the direction of closure of the valve 3), 7 is a source of negative pressure, 19 is a diaphragm chamber conducting negative pressure from the source of negative pressure 7, 20a is a valve seat secured to the housing 1 by press-fitting or the like and in abutment with one of the valves 3, 20b is a valve seat secured to the housing 1 by press-fitting or the like and in abutment with the other valve 4.

The operation of the invention will now be explained.

Two valves 3, 4 are fixed to respective valve seats 20a, 20b and are in the closed position. When negative pressure is applied to the diaphragm 5, the valve shaft 2 together with the two valves 3, 4 move upwards and put the first and second ports 1a, 1b in the open position and in communication with the third port 1c. When in the open position, engine exhaust gases flow into the valve housing 1 from the first and second ports 1a, 1b and outflow via the third port 1c. The gases may reenter the engine combustion chamber via the intake passage. As a result, it is possible to control increases in engine temperature and combustion of excess oxygen by controlling combustion by the amount of inflammable exhaust gas mixed in the engine combustion chamber even when the engine is on lean burn mode which uses a low mix ratio of air to fuel. It is also possible to control increases in nitrogen oxides ($NO_x$) which accompany increases in engine temperature and combustion gases which are problems associated with lean burn mode.

However, the following problems are associated with conventional exhaust gas re-circulation valves constructed as above. Although the valve seats 20a, 20b are secured to the valve housing body 1 by press fitting or the like, irregularities easily occur in the process accuracy of the seats or in measurements when the seats are affixed. Such irregularities result in the formation of gaps leading to gas leaks between the valve and the seat when the valve is closed. Furthermore, the high temperature and pressure exhaust gases create overheating and thermal expansion in the valve housing 1, the valve shaft 2 and the valves 3,4. If the rate of the thermal expansion of these respective elements differs, a gap is created between the valve and valve seat and an exhaust gas leak results. Such exhaust gas leaks lead to the problem that, for example, when the engine is idling, extreme decreases in engine revolutions may occur, thus making idling unstable.

It is a purpose of the present invention to solve the above problems by the provision of an exhaust gas re-circulation valve without gaps between the valve and valve seat when the valve is closed, such gaps being caused by irregularities in the process and assembly accuracy of parts such as the valve and the valve seat.

It is a further purpose of the present invention to provide an exhaust gas re-circulation valve which minimizes irregularities in the process and assembly accuracy of parts such as the valve and valve seat as well as prevents the formation of gaps between the valve and valve seat when the valve is closed which are caused by the above irregularities. The exhaust gas re-circulation valve therefore does not allow valve opening when the valve is in the closed position due to the thermal expansion of parts as a result of high temperature exhaust gases.

It is a further purpose of the present invention to provide an exhaust gas re-circulation valve which allows for the simple elimination of gaps formed between the valve and valve seat in the closed valve position due to irregularities in processing or assembling accuracy of parts when the exhaust gas re-circulation valve is assembled.

It is a further purpose of the present invention to provide an exhaust gas re-circulation valve in which the valve seat alone can absorb gaps formed between the valve and the valve seat when in the closed position due to irregularities in the process and assembly accuracy of the parts.

It is a further purpose of the present invention to provide an exhaust gas re-circulation valve in which the valve itself can absorb gaps formed between the valve and valve seat when in the closed position due to irregularities in process or assembly accuracy.

It is a further purpose of the present invention to provide an exhaust re-circulation valve which does not open when in the closed position due to thermal expansion of the valve housing and the valve shaft as a result of high temperature exhaust gas even if for example the rate of thermal expansion of the valve housing and the valve shaft is different.

DISCLOSURE OF THE INVENTION

The exhaust re-circulation valve of the invention consists of a valve housing having an exhaust gas inlet and outlet connectable to the engine exhaust gas re-circulation passage as well as a first side passage from the inlet side and a second side passage branching from the first side passage, a first and second passage aperture formed in the branching communicating part of the first and second side passages, first and second valve seats provided in the first and second passage apertures, a valve shaft movably mounted in the axial direction of the valve housing and first and second valves which are mounted on the valve shaft and which close in abutment with the first and second valve seats when the valve shaft moves in one direction. In the exhaust gas re-circulation valve, either the valve seat or the valve or both have an adjusting mechanism allowing for the closing abutment of both the first valve with the first valve seat and the second valve with the second valve seat by a change in position or shape, when the valve shaft is mounted on the valve housing.

The exhaust gas re-circulation valve allows for the closing abutment of both the first valve with the first valve seat and the second valve with the second valve seat by providing for a change in shape or position of at least one of the valve or valve seat when the valve shaft is mounted on the valve housing. Hence even if there is an irregularity in the processing or assembling of the components of the exhaust gas re-circulation valve, the formation of any gaps between the valve and valve seat as a result of the irregularities can be prevented.

In the exhaust gas re-circulation valve according to the present invention, at least one of the first and second valves is movably mounted in the axial direction with respect to the valve shaft.

In this way, even in the event of a gap trying to form, the exhaust gas re-circulation valve provides for the elimination of gaps between the valve and the valve seat by pressure being exerted in the direction of closing abutment of the valve with the valve seat due to the elasticity of the elastic member. Therefore irregularities in the assembly or processing of the component parts of the exhaust gas re-circulation valve can be absorbed by the displacement of the valve due to the elasticity of the elastic member. As a result gaps do not form between the valve and the valve seat. Furthermore even if the valve shaft or the valve housing undergo thermal expansion due to the temperature of the exhaust gas and the valve in the closed position begins to detach from the valve seat, the valve is supported in the closed position by the elasticity of the elastic member and as a result, as discussed above, the valve in the closed position does not open due to thermal expansion.

The exhaust gas re-circulation valve of the present invention provides for the degree of press fitting of the first valve seat to be adjustable with respect to the first passage aperture so that the mutual distance between the first and second valve seats is equal to that between the first and second valves.

By using this kind of exhaust gas re-circulation valve it is possible to adjust the degree of press fitting of the first valve seat with respect to the first aperture when assembling the exhaust gas re-circulation valve so that the mutual distance between the first and second valve seats is equal to that between and the first and second valves. Hence it is possible to prevent the formation of gaps between the valve and valve seat as a result of irregularities in the assembling and processing of the valve seat.

At least one of the first and second valve seats of the exhaust gas re-circulation valve has a deformable member which is in deformable pressure contact with the valve when at least one of the first and second valves is in abutment.

In this way, when the valve is in abutment with the valve seat, gaps forming between the valve and the valve seat as a result of irregularities in the process or assembly accuracy of the valve seat can be prevented by the deformable member of the valve seat itself by the deformable pressure contact of the valve on the valve seat.

At least one of the first and second valves of the exhaust gas re-circulation valve has a deformable member in deformable pressure contact with the valve seat when at least one of the first and second valve seats is in abutment.

In this way when the valve is in abutment with the valve seat, gaps forming between the valve and the valve seat due to irregularities in the process or assembly accuracy of the valve seats are prevented by the deformable member of the valve itself by the deformable pressure contact of the deformable member of the valve with respect to the valve seat.

The first valve of the exhaust gas re-circulation valve is mounted in an adjustable manner movable in the axial direction with respect to the valve shaft so that the distance to the second valve is equal to the distance between the first and second valve seats.

In this way, it is possible to adjust the distance so that the distance between the first and second valves is equal to the distance between the first and second valve seats by the adjustable movement of the first valve along the valve shaft during assembly of the exhaust gas re-circulation valve. Such adjustment allows the prevention of gaps forming between the valve and the valve seat as a result of irregularities in the process or assembly accuracy of the valve seat and the valve.

The exhaust gas re-circulation valve of the present invention comprises a valve housing which has an exhaust gas inlet and outlet connectable to the engine exhaust gas re-circulation passage and includes a first outlet passage on the outlet side and a second side passage which branches from the first side passage, a first and second passage aperture formed in the branching connection part of the first and second side passage, first and second valve seats provided on the first and second passage apertures, a valve shaft mounted movably in the axial direction of the valve housing, and first and second valves mounted on the valve shaft which abuts closingly with the first and second valve seats when the valve shaft moves in one direction. A case is fixed inside the valve housing which connects the first and second side passages and to which is fixed the first and second valve seats.

By means of the exhaust gas re-circulation valve, in order to affix the first and second valve seats, it is possible to form a case which is separate from the valve housing and is made from a material having a rate of thermal expansion equal to that of the valve shaft Therefore even if the case and the valve shaft undergo thermal expansion having been heated by the high temperature exhaust gases, since the rate of thermal expansion of the case will be the same as that of the valve shaft due to the fact that both are made from materials having equal rates of thermal expansion, gaps will not form between the case and the valve shaft, that is to say on the mounting section of the valve seat. As a result, exhaust gas does not leak from the mounting section of the valve seat during valve closure.

SIMPLE EXPLANATION OF THE DRAWINGS

FIG. 8(*b*) shows the components of FIG. 8(*a*) as assembled.

Figure 9:
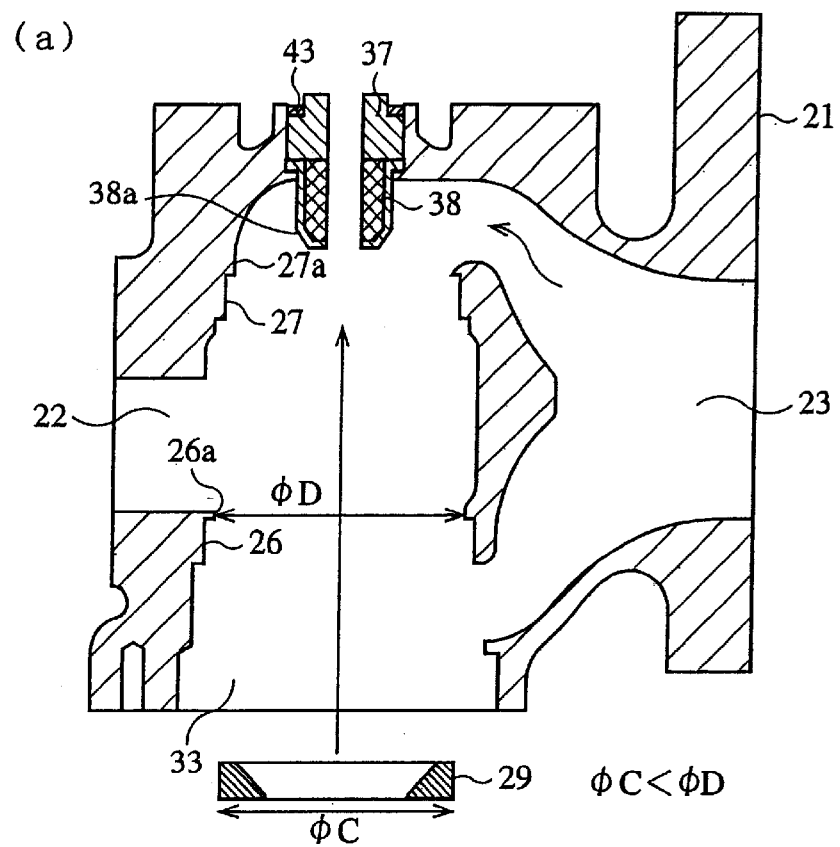
Figure 9:
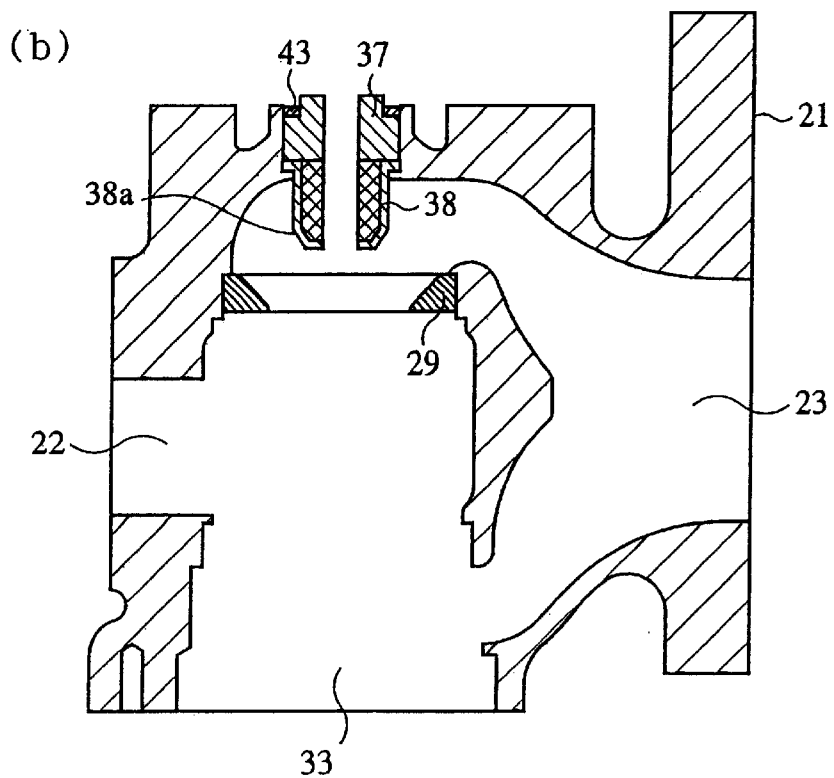

FIGS. 9(*a*),(*b*) and 10(*a*),(*b*),(*c*) are process assembly diagrams explaining the assembling of the components of the exhaust gas re-circulation valve according to each embodiment of the invention.

PREFERRED EMBODIMENTS OF THE INVENTION

The present invention is explained in greater detail below with respect to the preferred embodiments according to the accompanying figures.

Embodiment 1

Figure 1:
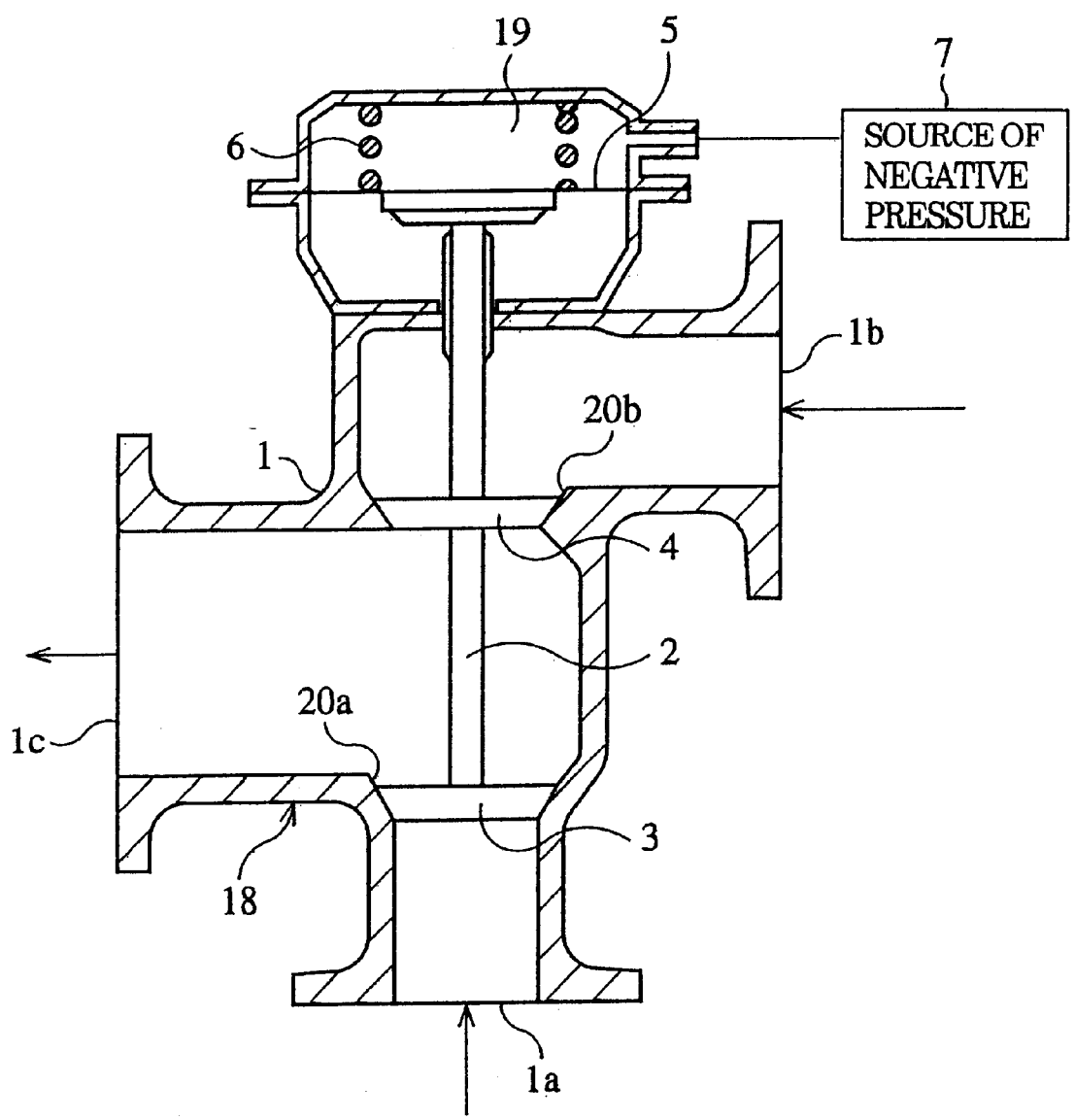
FIG. 1 is a cross section showing a conventional exhaust gas re-circulation valve.
Figure 2:
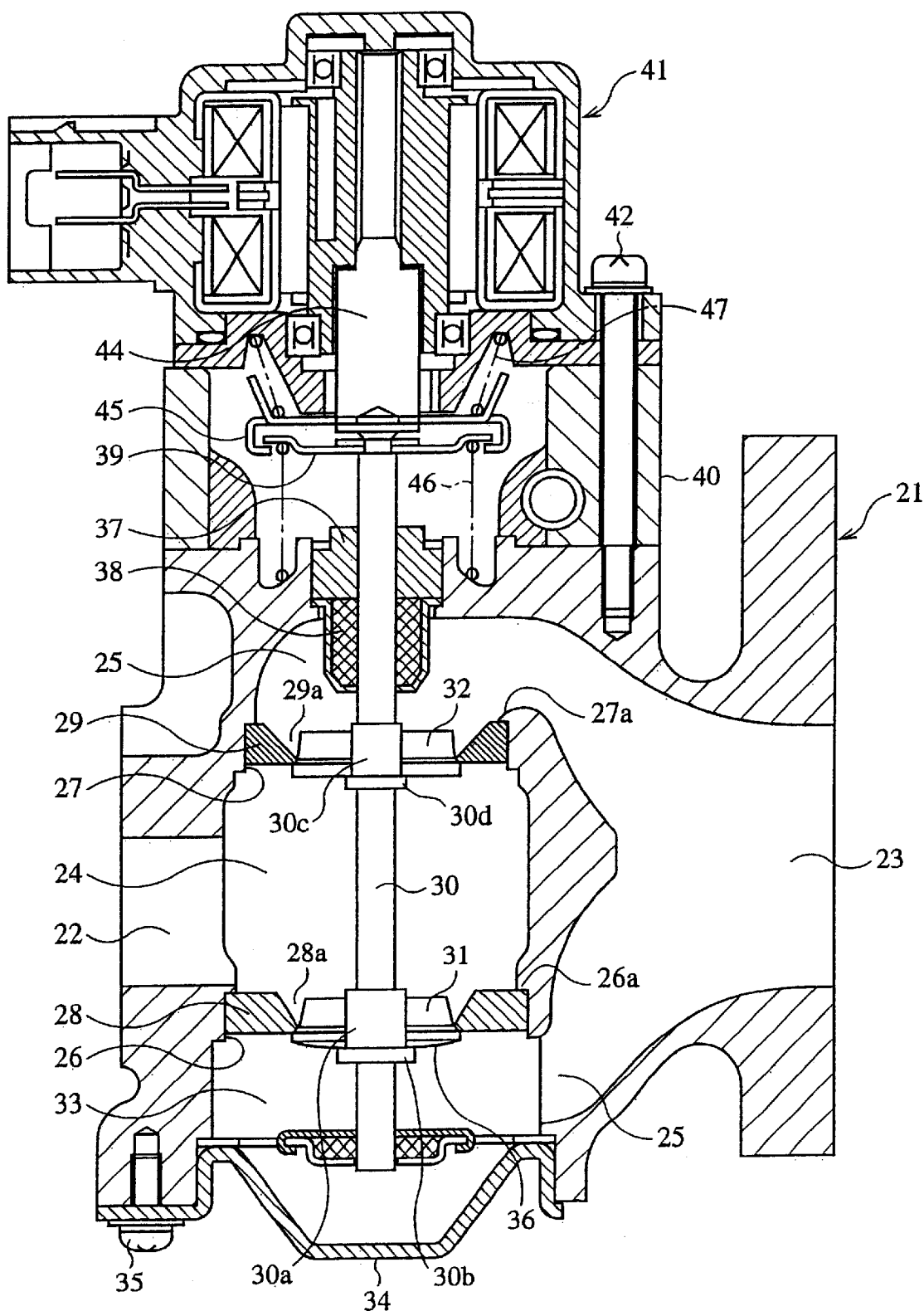
FIG. 2 is a cross section showing an exhaust gas re-circulation valve according to a first embodiment of the invention.

FIG. 2 is a cross section of the exhaust gas re-circulation valve according to a first embodiment of the invention. In the figure, 21 is a valve housing connectable to the exhaust gas passage of the engine, 22 is an inlet in the valve housing 21 for inletting the exhaust gases, 23 is an outlet in the valve housing 21 for allowing the exhaust gas to re-circulate, 24 is a first side passage formed in the valve housing 21, 25 is a second side passage which is formed in a similar fashion in the valve housing 21 and which branches from the first side passage 24 and connects the flow with the outlet 23.

26, 27 are first and second passage apertures used on the valve seat mountings and formed in the branching connecting part between the first and second side passages 24,25 in the valve housing 21. 26a is a first affixing element affixing the valve seat and formed in a ridge on the upper end of the first passage aperture 26, 27a is a second affixing element affixing the valve seat and formed in a similar manner on the upper end of the second passage aperture 27, 28 is a first valve seat secured by pressure fitting to the first passage aperture 26 and 29 is a second valve seat secured by pressure fitting to the second aperture 27. Both valve seats 28 and 29 have a valve seat holes 28a and 29a in their lower edge which have a tapering shape and slowly decreasing radius.

30 is a valve shaft mounted movably in the axial direction of the valve housing 21. 30a is a first valve insertion element of a cylindrical shape and formed in the lower approach of the valve shaft 30, 30b is a first valve stopper formed on the lower edge of the first valve insertion element 30a, 30c is a second valve insertion element of a cylindrical shape and formed near the middle of the valve shaft 30, 30d is a second valve stopper formed on the lower edge of the second valve insertion element 30c. The first and second valve stoppers 30b and 30d have a greater diameter than the first and second valve insertion elements 30a and 30c.

31 is a first valve slidably connected in the axial direction of the first valve insertion element 30a of the valve shaft 30. 32 is a second valve connected to the second valve insertion element 30c of the valve shaft 30 and fixed in abutment to the second valve stopper 30d.

33 is a component assembly aperture provided in the valve housing 21. The component assembly aperture 33 is formed of a sufficient aperture so as to allow the assembling of the first and second valve seats 28,29 and the first and second valves 31, 32 mounted on the valve shaft in the valve housing 21.

34 is a closure member which closes the component assembly aperture 33. 35 is a clamp screw for the closure member 34, 36 is an elastic member intercalating between the lower surfaces of the first valve 31 and the first valve stopper 30b of the valve shaft 30. The elastic member 36 is formed from a blade spring or the like and compresses the first valve 31 which is slidable in the axial direction of the valve shaft 30 as discussed above so that the first valve 31 is in abutment with the first valve seat 28.

37 is a bush mounted on the top of the valve housing 30, 38 is a filter fixed to the bottom edge of the bush 37. The valve shaft 30 passes through central hole of the bush 37 and the filter 38 and is movable in the axial direction.

39 is a spring seat connected to the upper edge of the valve shaft 30, 40 is a spacer fixed to the upper edge of the valve housing 30, 41 is a stepping motor mounted on the valve housing 30 through the spacer 40, 42 is a clamp screw jointly fixing the spacer 40 and the stepping motor 41 to the valve housing 30, 44 is a motor shaft which displaces vertically, 45 is a spring seat connected to the lower edge of the motor shaft 44, 46 is a compressed spring intercalating between the spring seat 39 on the upper edge of the valve shaft 30 and the valve housing 21, 47 is a compressed spring intercalating between the spring seat 45 on the lower edge of the motorshaft 44 and the stepping motor 41.

According to the first embodiment of the exhaust gas re-circulation valve as explained above, the first valve 31 which is slidable with respect to the valve shaft 30 normally pushes in the abutting direction of closure towards the first valve seat 28 due to the elasticity of the elastic member 36 such as a blade spring. Hence when the exhaust gas re-circulation valve is assembled, even if there is an irregularity in the processing or assembling accuracy of components such as the first and second valve seats 28, 29 and the first and second valves 31, 32, it is possible to assemble both the first valve 31 and the first valve seat 28 and the second valve 32 and the second valve seat 29 so that they close abuttingly due to the deformable movement of the valve 31 which is enabled by the elasticity of the elastic member 36. Furthermore when the exhaust gas re-circulation valve is in use after assembling, although the valve housing 21 and the valve shaft 30 undergo thermal expansion due to being heated by the high temperature exhaust gases passing through valve housing 21, even if the first valve 31 tries to open from a closed position due to a difference in the rate of thermal expansion between the valve housing 21 and the valve shaft 30, the valve will be maintained in the closed position by the elasticity of the elastic member 36.

Therefore according to the first embodiment, the elastic member 36 functions as an adjusting mechanism which places both the first valve 31 with the first valve seat 28 and the second valve 32 with the second valve seat 29 in closing abutment. Therefore even if there is an irregularity in the assembling or process accuracy of components such as the valve or the valve seat or if there is a difference in the rate of thermal expansion of the valve shaft and the valve housing, it is possible to prevent the formation of gaps between the valve and the valve shaft during closure and to increase closure accuracy.

Embodiment 2

Figure 3:
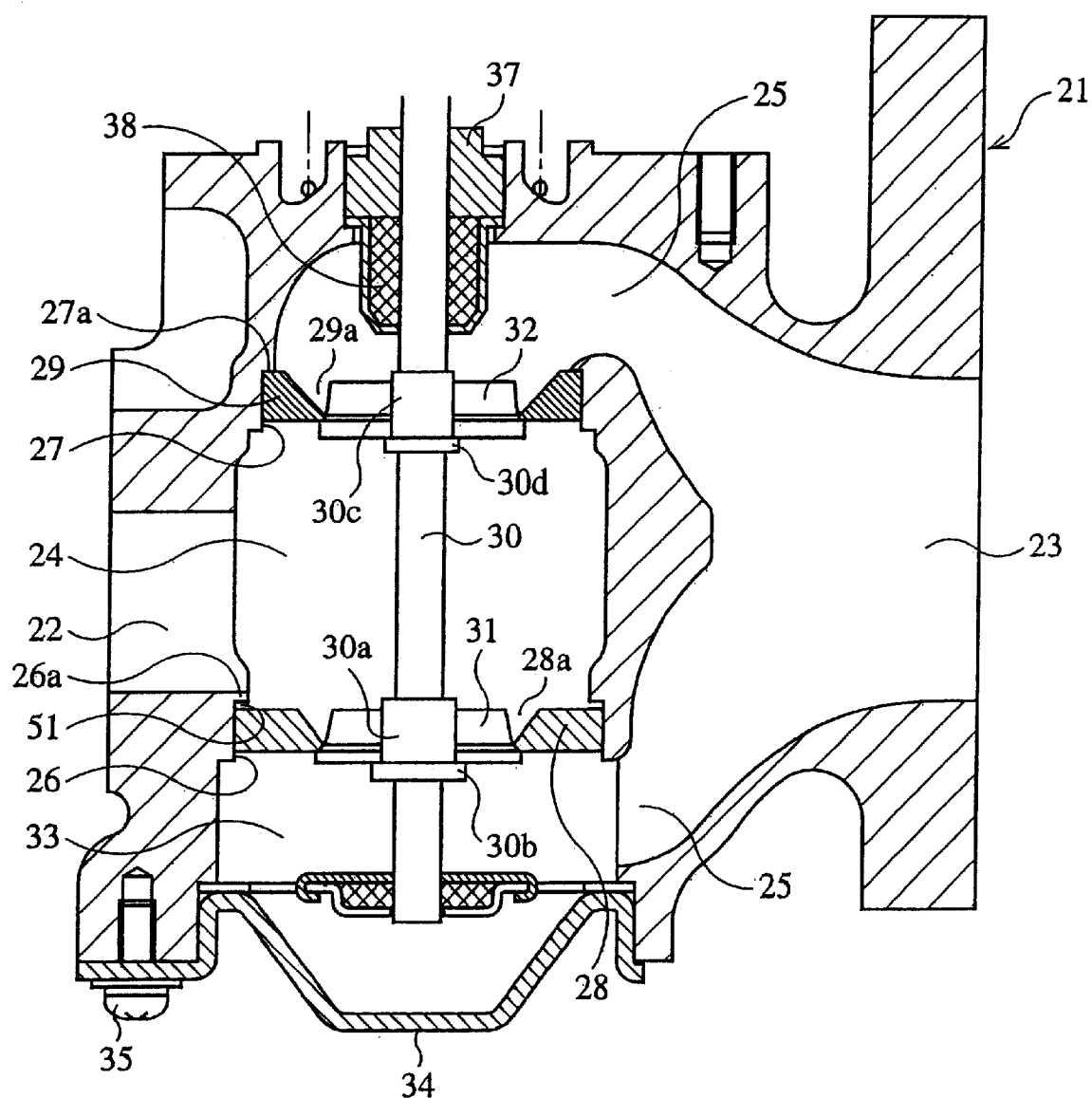
FIG. 3 is a cross section showing an exhaust gas re-circulation valve according to a second embodiment of the invention.

FIG. 3 is a cross section of the exhaust gas re-circulation valve according to a second embodiment of the invention. In the figure, 51 is a gap for adjusting the degree of valve seat press fitting and which is provided between the first affixing element 26a on the upper edge of the first passage aperture 26 of the valve housing 30 and the first valve seat 28.

In other words in the second embodiment, when the exhaust gas re-circulation valve is assembled, the gap 51 is provided beforehand so as to allow the adjustment of the degree of press fitting of the first valve seat 28 with respect to the first passage aperture 26. This allows the mutual distance between the two valves 31, 32 on the valve shaft 30 to be equal to that between the two valve seats 28, 29.

Therefore according to the second embodiment, when the exhaust gas re-circulation valve is assembled, the length of the gap 51 can be set so as to allow the adjustment of the degree of press fitting of the first valve seat 28 with respect to the first passage aperture 26 This allows the mutual distance between the two valves 31, 32 on the valve shaft 30 to be equal to that between the two valve seats 28, 29 as pointed out above. The variation in the length of the gap 51 due to the adjustment of the degree of press fitting of the first valve seat 28 allows for the absorption of irregularities in the assembling or process accuracy of the valve or valve seat. As a result, it is possible to mount the valve seat so that gaps are not generated between the valve and the valve seat during closure after assembling.

Embodiment 3

Figure 4:
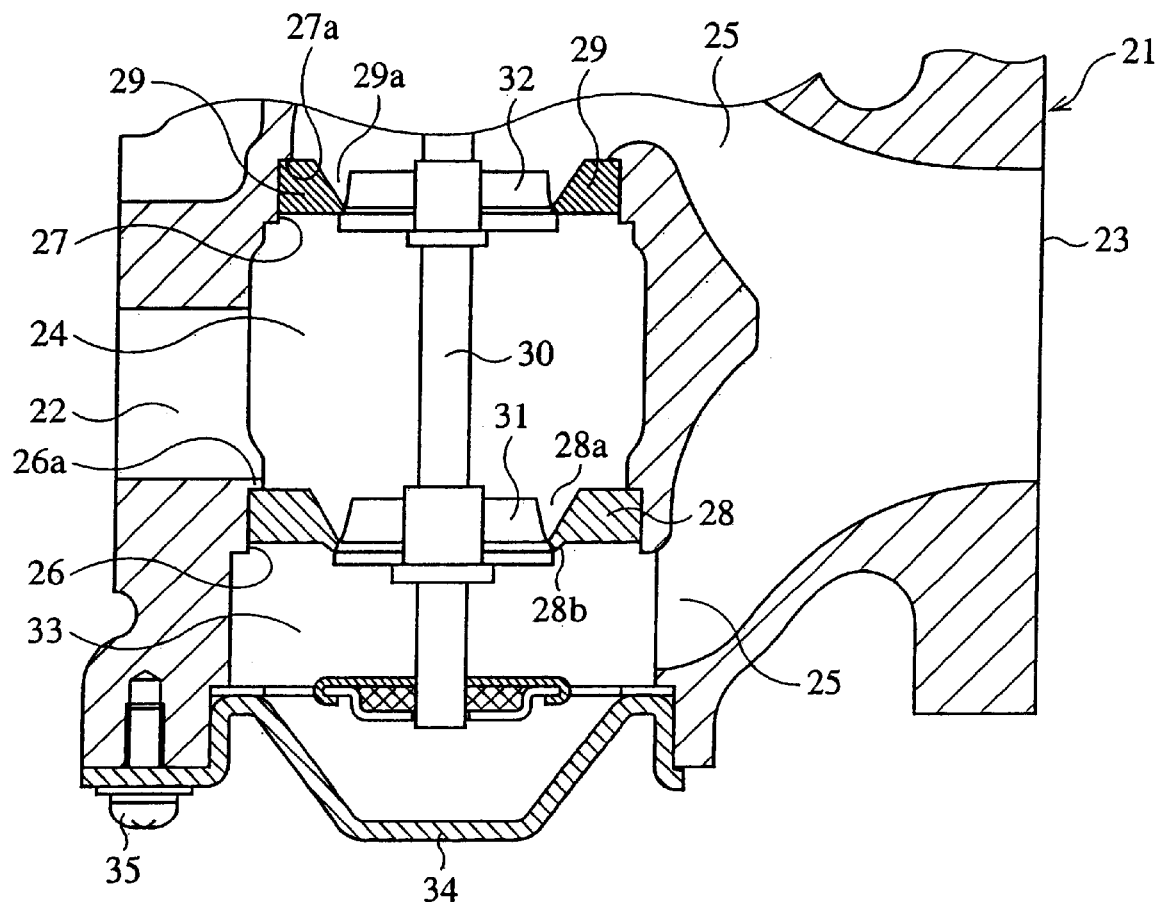
FIG. 4 is a cross section showing an exhaust gas re-circulation valve according to a third embodiment of the invention.

FIG. 4 is a cross section of an exhaust gas re-circulation valve according to a third embodiment of the invention. In the figure, 28b is a deformable bit (deformable member) which undergoes elastic deformation and is formed on the lower peripheral edge of the aperture forming the lesser radius aperture end of the valve seat hole 28a comprising the taper of the first valve seat 28. The deformable bit 28b projects downwardly along the tapering face of the valve seat hole 28a.

In other words, in embodiment 3 when the exhaust gas re-circulation valve is assembled, the deformable bit 28b of the valve seat deforms elastically and abuts with the first valve 31.

In such a way, as the deformable bit 28a of the first valve seat 28 pushes against the first valve 31, irregularities in the assembling or process accuracy (component accuracy) of the first valve seat 28 and the first valve 31 can be absorbed by the deformable bit 28b of the valve seat 28 itself. Hence the generation of gaps between the valve seat 28 and the valve 31 resulting from irregularities in assembling or component accuracy may be prevented.

Embodiment 4

Figure 5:
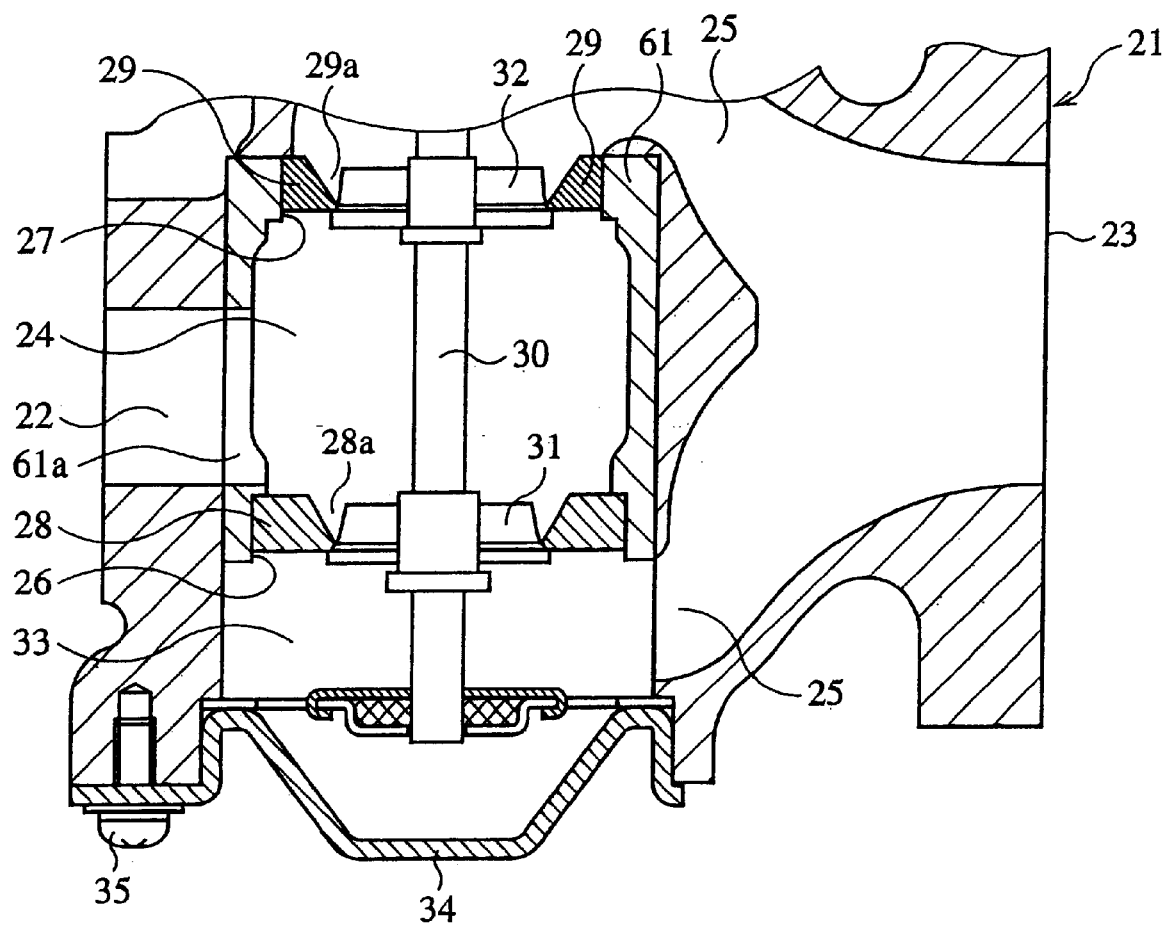
FIG. 5 is a cross section showing an exhaust gas re-circulation valve according to a fourth embodiment of the invention.

FIG. 5 is a cross section of an exhaust gas re-circulation valve according to a fourth embodiment of the present invention. In the figure, 61 is a case for mounting the valve seat and is fixed by press fitting in the valve housing 21. The case 61 is formed by a material having the same rate of thermal expansion as the valve shaft 30 and has a cylindrical shape opened at the top and bottom. The top aperture and the bottom aperture of the case 61 are fixed by press fitting to the second and first valve seats 29 and 28 respectively. Furthermore 61a is a connecting aperture provided in the case 61 and connecting with the first side passage 24 of the valve housing 21.

According to embodiment 4, as the case 61 is used as a valve seat mounting member separate from the valve housing 21, it is formed from a material having an equal ratio of thermal expansion to that of the valve shaft 30 as pointed out above. In this way, even if the case 61 and the valve shaft 30 undergo thermal expansion having been heated by the high temperature/pressure exhaust gases passing into the case 61 from the first side passage 24 of the valve housing 21, due to the fact that the thermal expansion of the case 61 and the valve shaft 30 is equal, gaps do not form between the case 61 and the valve seats 28, 29, that is to say on the mounting members of the valve seats 28, 29. As a result, gas leakage from the mounting members of the valve seats 28, 29 are prevented.

Embodiment 5

Figure 6:
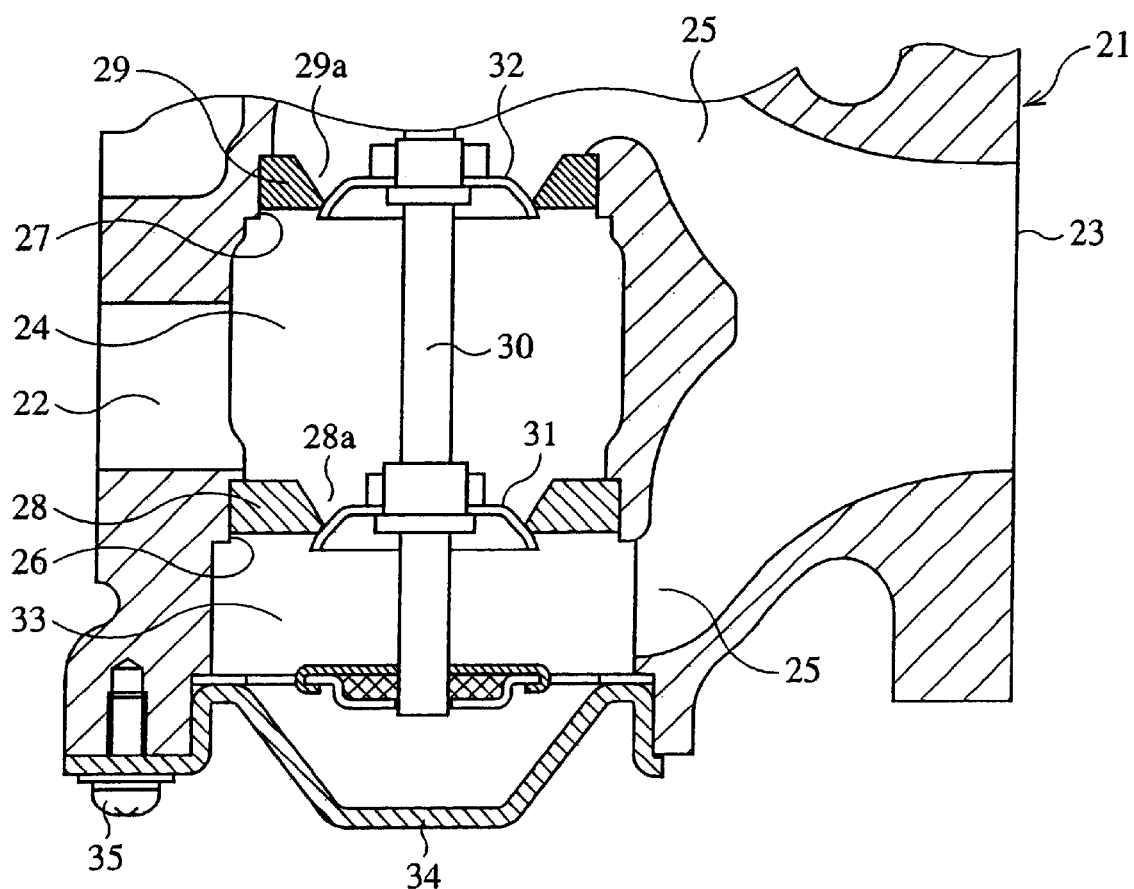
FIG. 6 is a cross section showing an exhaust gas re-circulation valve according to a fifth embodiment of the invention.

FIG. 6 is a cross section of an exhaust gas re-circulation valve according to a embodiment 5 of the present invention. In embodiment 5, the first and second valves 31, 32 are formed by a thin plate made of a material such as stainless steel. The valves 31, 32 should be ??? abutted conforming with the first and second valve seats 28, 29 and plastically deformed when assembled.

In other words, according to embodiment 5, when assembling the valve shaft 30 into the valve housing 21, it is possible for example to deform and abut both the valves 31, 32 on the respective valve seats 28, 29 by applying pressure in the axial direction of the valve shaft 30.

In this way, the formation of gaps between the valve seat and the valve as a result of irregularities in the assembling or process accuracy of the valve seat or the valve can be prevented by the inverse deformation of the first and second valves 31, 32.

Embodiment 6

Figure 7:
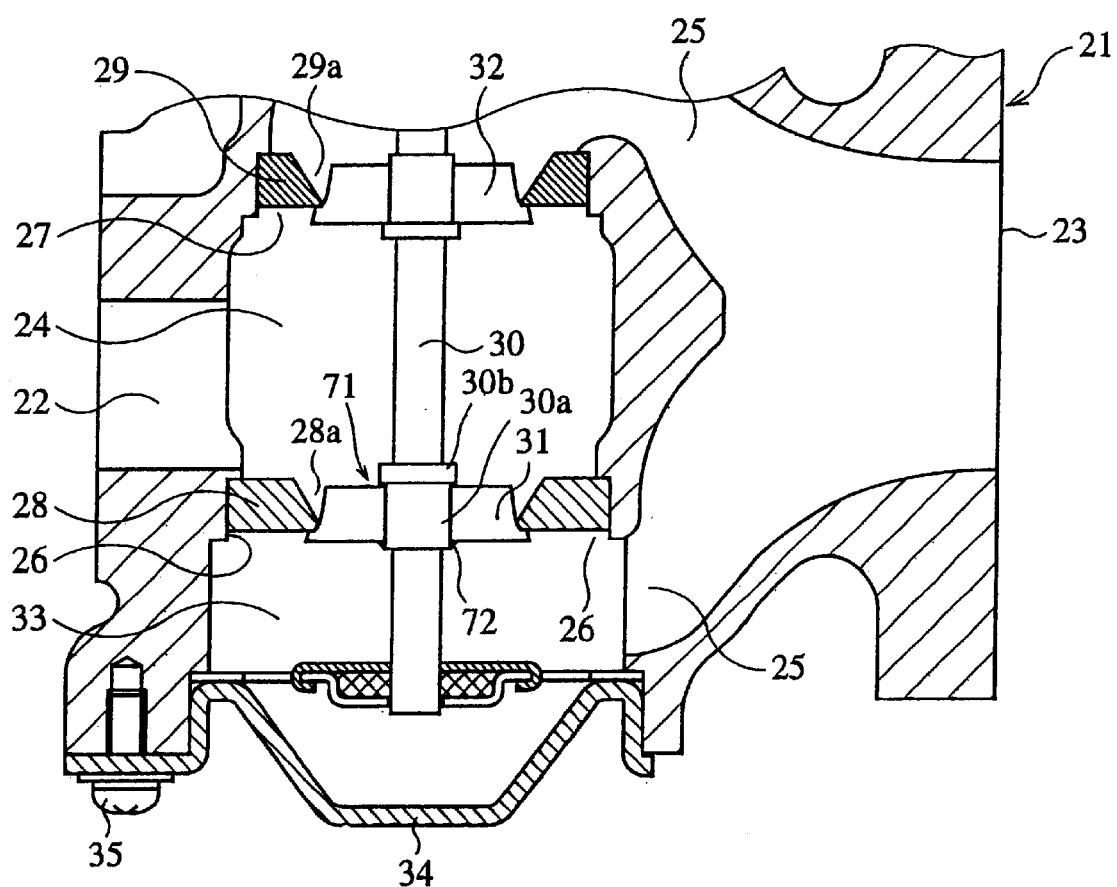
FIG. 7 is a cross section showing an exhaust gas re-circulation valve according to a sixth embodiment of the invention.

FIG. 7 is a cross section of an exhaust gas re-circulation valve according to embodiment 6 of the invention. In the figure, 71 is a gap for adjusting the degree of press fitting of the valve and is provided between the first stopper 30b of the valve shaft 30 and the first valve 31 press fitted into the first valve insertion element 30a of the valve shaft 30. 72 is a welded section between the first valve insertion element 30a and the first valve 31.

In other words, in embodiment 2 above, although a gap is provided to adjust the degree of press fitting of the valve seat between the first stopper 26 and the first valve seat 28 in the first passage aperture 26 of the valve housing 21, in embodiment 6, a gap 71 is provided on the valve shaft side 30 in order to adjust the degree of press fitting of the first valve 31 with respect to the first valve insertion element 30a of the valve shaft 30. When the first valve 31 is press fitted with respect to the valve shaft 30, the valve 31 is welded to the valve shaft 30 after the adjustment of the degree of press fitting of the valve 31 with respect to the valve shaft 30 so that the valve 31 abuts with the first valve seat 28 without gaps.

According to embodiment 6, when the first valve 31 is press fitted with respect to the valve shaft 30, it is welded after the degree of press fitting has been adjusted in the above manner. Hence it is possible to prevent the formation of gaps between the valve seat and the valve resulting from irregularities in the assembling or process accuracy of the valve seat or the valve. Further in embodiment 6, since the first valve 31 is welded to the valve shaft 30, the first stopper 30b of the valve shaft 30 becomes unnecessary.

Next the assembling of the exhaust gas re-circulation valve will be explained with respect to each embodiment of the invention.

FIG. 8(a) is an exploded view showing the relationship of the valve shaft and the two valves with a single valve seat in the exhaust gas re-circulation valve device according to embodiments 1 to 6 of the present invention. FIG. 8(b) is a view of the components of FIG. 8(a) as assembled.

In FIG. 8(a), 31a is the central hole of the first valve 31, 32a is the central hole of the second valve 32.

When assembling the valve shaft 30 and the first and second valves 31, 32 of the exhaust gas re-circulation valve according to embodiment 1, after the elastic member 36 of FIG. 2 (not shown in FIG. 8) is placed into the first valve insertion element 30a of the valve shaft 30, the valve shaft 30 is pushed through the central hole of the first valve 31, the first valve 31 is disposed slidable in the axial direction of the first valve insertion member in the valve shaft 30, and the spring member 36 is inserted between the valve 31 and the first stopper 30b.

Next after the first valve seat 28 is placed in the valve shaft 30, the valve shaft 30 is introduced through the central hole 32a of the second valve 32, the central hole 32a of the second valve 32 is press fit to the second valve insertion element 30c of the valve shaft 30, and the valve 32 is placed in abutment with the second stopper 30d. In this state, the second valve 32 is fixed to the valve shaft 30 by caulking a position on the side opposite the second stopper 30d of the second valve insertion element 30c. In this way, the elastic member 36 is mounted with respect to the valve shaft 30. The first valve 31 is set in a position slidable with respect to the axial direction and at the same time the second valve 32 is fixed by press fitting thus allowing the first valve seat 28 between the first and second valves 31, 32 to act as a unit.

When assembling the valve shaft 30 and the first and second valves 31, 32 of the exhaust gas re-circulation valve according to embodiments 2 to 4 of the present invention, the valve shaft 30 is pushed through the central hole 31a of the first valve 31, the central hole 31a of the first valve 31 is press fitted into the first valve insertion element 30a of the valve shaft 30, and the valve 31 is placed in abutment with the first valve stopper 30b of the valve shaft 30. In this state, the first valve 20 is fixed to the valve shaft 30 by caulking a position on the side opposite the first valve stopper 30b of the first valve insertion element 30a.

Next after the first valve seat 29 is placed on the valve shaft 30, the valve shaft 30 is pushed through the central hole 32a of the second valve 32, the central hole 32a of the second valve 32 is press fitted onto the second valve insertion element 30c of the valve shaft 30, and the valve 32 is placed in abutment with the second valve stopper 30d. In this state, the second valve 32 is fixed to the valve shaft 30 by caulking a position opposite the second valve stopper 30d of the second valve insertion member 30c. In such a way, as shown in FIG. 8(b), the first and second valves 31,32 are secured respectively by press fitting to the valve shaft 30. At the same time, the second valve seat 29 between the valves 31, 32 becomes a unit on the valve shaft 30.

The configuration of the first and second valves 31, 32 of the exhaust gas re-circulation valve changes in embodiment 5. However the valve shaft 30 and the first and second valves 31, 32 can be assembled by an assembly process similar to that of embodiments 2 to 4 above.

When assembling the valve shaft 30 and the first and second valves 31, 32 of the exhaust gas re-circulation valve according to embodiment 6 as shown in FIG. 7, the process is essentially the same as embodiments 2 to 4 with the only the second valve 32 being secured by press fitting to the second valve insertion member 30c of the valve shaft 30. The affixation of the first valve 31 will be explained hereafter.

Figure 10:
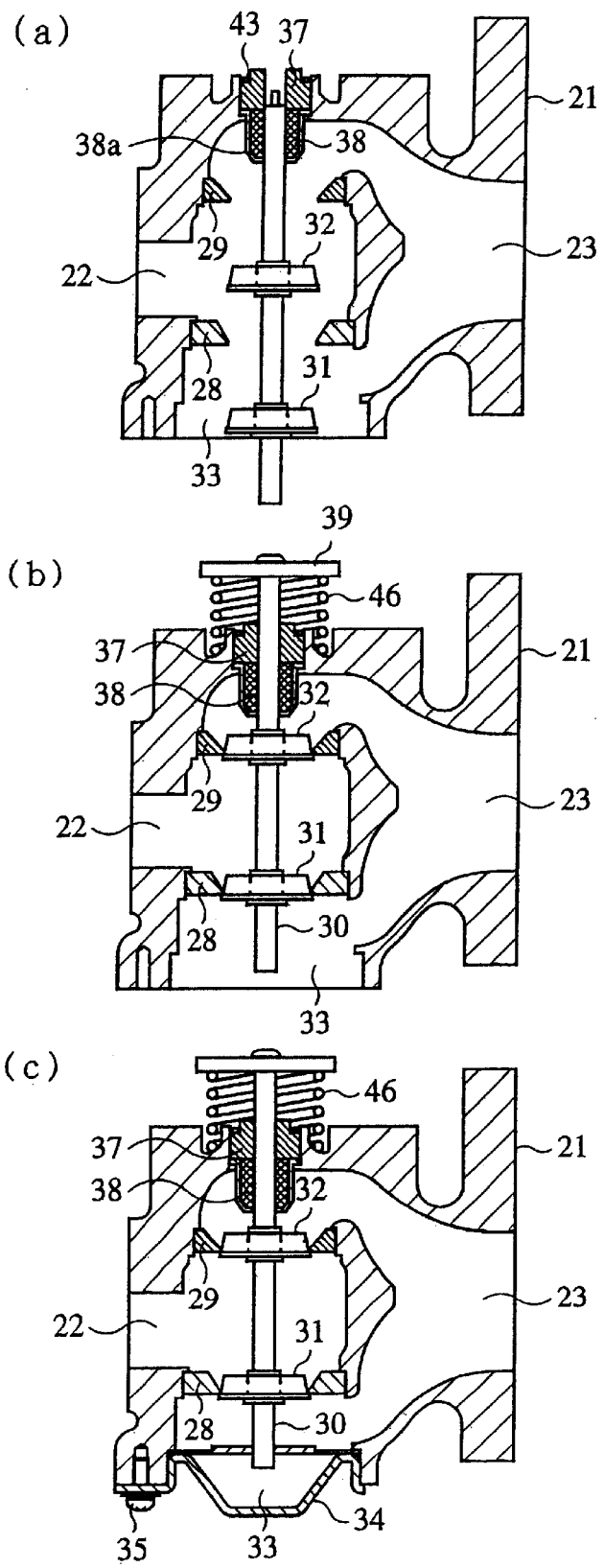

As above, the valves 31, 32 mounted on the valve shaft 30 are assembled with respect to the valve housing 21 by the process shown in FIGS. 9 and 10.

FIGS. 9(a),(b) and 10(a), (b), (c) show the assembling method of the exhaust gas re-circulation valve according to each embodiment of the present invention.

When assembling the exhaust gas re-circulation valve according to the first embodiment, the filter 38 with an attached holder 38a, the bush 37 and the washer 43 are inserted in order in the valve shaft through-hole provided in the upper section of the valve housing 21 and are affixed by caulking. In this state, the second valve seat 29 is press fitted through the second aperture 27 from the component assembly aperture 33 until it abuts with the second affixing element 27a. At this stage the second valve seat 29 is fixed to the valve housing 21 by caulking the lower edge of the second valve seat 29 in the second passage aperture 27. (Refer to FIG. 9(b)). This process is capable of application to all embodiments of the exhaust gas re-circulation valve of the present invention with the exception of embodiment 4 (FIG. 5). The assembling in embodiment 5 will be explained below.

Next the valve shaft 30 on which is mounted the first and second valves 31, 32 and the first valve seat 28 as stated above, is introduced from the component assembling aperture 33 of the valve housing 21 to the second valve seat 29 and the upper edge of the valve shaft 30 is inserted into the filter 38. At the same time, after the first valve seat 28 is press fitted into the first passage aperture 26 until it abuts with the first affixing element 26a, the valve seat 28 is fixed to the valve housing 21 by caulking the lower edge of the first valve seat 28 in the aperture 26 (Refer to FIG. 10(a)). After fixation, the valve shaft 30 is pushed further and the second valve 32 and second valve seat 29 and first valve 31 and first valve seat 28 are respectively placed in abutment and at the same time, a spring seat 39 is mounted on the top of the valve shaft 30 which is projecting from the bush 37. At this time, a compressed spring 46 is intercalated between the spring seat 39 and the valve housing 21. (Refer to FIG. 10(b)) Last the component assembly aperture 33 of the valve housing 21 is closed with a closure member and after the closure member 34 is fixed to the housing 21 by a clamp screw (Refer to FIG. 10(c)), as shown in FIG. 2, the exhaust gas re-circulation valve according to embodiment 1 is assembled by mounting a stepping motor 41 on the top of the valve housing 21 through a spacer 40.

In this way, in the exhaust gas re-circulation valve according to embodiment 1, a first valve 31 is slidable with respect to a valve shaft 30 and the valve 31 is pushed in the direction of valve closure by an elastic member 36. Therefore gaps forming between the valve and the valve seat due to irregularities in the assembling or processing accuracy of the valve or valve seat can be avoided.

In the second embodiment of the exhaust gas re-circulation valve of the invention as shown in FIG. 3, it is possible to adjust the mounting distance of the first valve seat 28 with respect to the second valve seat 29, which is press fitted to the second passage aperture 27 and fixed by caulking, so that the distance can be adjusted by extending the gap 51 so the mounting distance is that much longer than the mutual distances of the first and second valves 31, 32. Therefore during assembling, when the second valve 32 has been correctly press fitted to the second valve seat 29, it is possible to adjust the placement of the first valve seat 28 so the first valve abuts exactly with the first valve seat 28 and gaps are not formed between the two. Furthermore the order of assembly is identical to that of embodiment 1.

The order of assembling the exhaust gas re-circulation valve according to embodiment 3 of the invention as shown in FIG. 4, is exactly the same as that of embodiment 1. However the first valve seat 28 has a deformable bit 28b which tapers in the inverse direction to that of the first valve 31. When assembled, the deformable bit 28b is pushed against the first valve 31 and stops any gaps between the valve 31 and the valve seat 28 by plastic deformation.

Next the assembly of the exhaust gas re-circulation valve according to embodiment 4 will be explained with reference to FIG. 5.

Firstly as shown in FIG. 9(a) after the case 61 is press fitted via the component assembling aperture 33 to the valve housing 21 to which is attached the filter 38 with a holder 38a, the bush 37 and the washer 43, the second valve seat 29 is press fitted and secured by caulking to the top aperture (corresponds to the second passage aperture 27) of the case 61.

Figure 8:
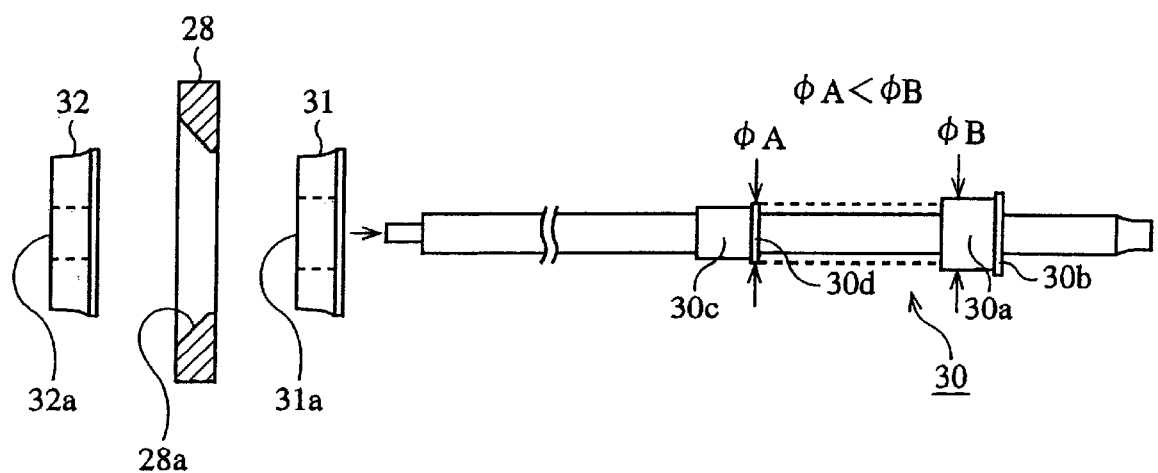
FIG. 8(*a*) is an exploded view showing the relationship of the valve shaft and the two valves with respect to one valve seat in the exhaust gas re-circulation valve according to embodiments 1–6 of the invention.
Figure 8:
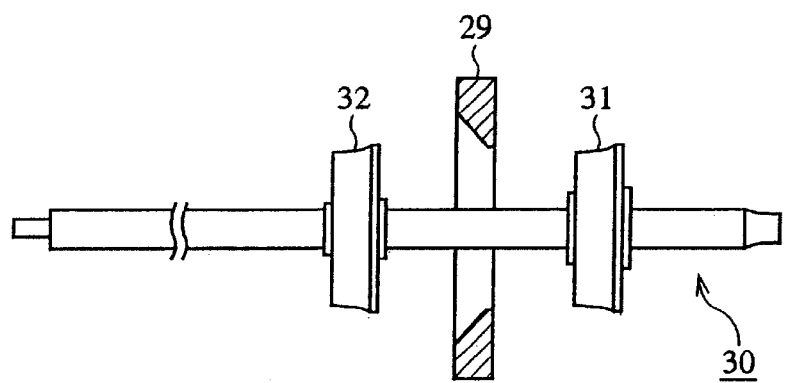

Next as in shown in FIG. 8, after the valve shaft 30, on which is mounted the first and second valves 31, 32 and the first valve seat 28, is introduced into the case 61 from the component assembly aperture 33 and the top edge of the valve shaft 30 is inserted into the filter 38, the first valve seat 28 on top of the valve shaft 30 is press fitted and secured by caulking to the lower aperture (which corresponds to the first passage aperture 26) of the case 61. The rest of the process is the same as that described in embodiment 1.

Hence the exhaust gas re-circulation valve assembled in accordance with embodiment 4, has first and second valve seats 28, 29 attached to the case 61 which is separate from the valve housing 21 and the embodiment achieves the results as pointed out in embodiment 4.

In the assembly process of the exhaust gas re-circulation valve according to embodiments 5 and 6, the only point of difference in that when the second and first valves 32, 31 are placed in a position pressuring the second and first valve seats 29 and 28, the assembly process only differs from that in embodiment 1 on the point of the inverse deformability of the valves 32, 31 and is identical in all other respects.

In the assembly of the exhaust gas re-circulation valve according to embodiments 6 and 7, when the second valve seat 29 is pushed and secured by caulking to the second passage aperture 27 of the valve housing 21 as shown in FIGS. 9(a) and (b) and after the valve shaft 30, to which only the second valve 32 is secured by caulking, is pushed through the second valve seat 29 in the valve housing 21 from the component assembly aperture 33 and the top of the valve shaft 30 is inserted into the filter 30, the first valve seat 28 is secured by caulking to the first passage aperture 26 of the valve housing 21. Next the first valve 31 is pressed into the valve shaft 30 and the valve 31 is placed in pressure contact with the first valve seat 28. In this state, the first valve 31 is welded to the valve shaft 30. Other elements of the assembly process are the same as those described in embodiment 1.

By assembling the exhaust gas re-circulation valve in such a way, it is possible to accurately place the first valve 31 in pressure contact with the first valve seat 28 and prevent the formation of gaps between the two.

Furthermore in order to prevent the detachment of the valve 31, 32 from the valve shaft 30, a ring for preventing detachment should be fixed by welding or the like to the opposite side of the valve stoppers 30b, 30d in the valve insertion elements 30a, 30c of the valve shaft 30.

Industrial Applicability

As shown above the exhaust gas re-circulation valve of the present invention can control the re-circulation of exhaust gas with high accuracy by being placed in connection with the engine exhaust gas re-circulation passage of a diesel turbo vehicle or the like.

What is claimed is:

1. An exhaust gas re-circulation valve comprising
a valve housing having an inlet and an outlet for exhaust gas connectable to the engine exhaust gas re-circulation passage and, forming on the inlet side, a first side passage and a second side passage branching from the first side passage,
first and second passage apertures formed in the branching connecting part of the first and second side passages,
first and second valve seats provided on the first and second passage apertures,
a valve shaft mounted slidably in the axial direction of the valve housing and first and second valves mounted on the valve shaft and closing in abutment with the first and second valve seats when the valve shaft moves in one direction,
wherein in a case, which is formed by a material having the same rate of thermal expansion as the valve shaft and which communicates with the first and second side passages, is fixed to the valve housing and the first and second valve seats are fixed to the case.

2. An exhaust gas re-circulation valve comprising:
a valve housing having an inlet and an outlet for exhaust gas which is connectable with the engine exhaust gas re-circulation passage and which forms, on the inlet side, a first side passage and a second side passage which branches from the first side passage,
first and second passage apertures formed in the branching connecting part of the first and second side passages,
first and second valve seats provided in the first and second passage apertures,
a valve shaft mounted movably in the axial direction of the valve housing,
first and second valves mounted on the valve shaft and closing in abutment with the first and second valve seats when the valve shaft moves in one directions,
wherein the valve shaft is mounted in the valve housing and an adjustable mechanism is provided so that both the first valve and the first valve seat and the second valve and the second valve seat close in abutment due to deformation of at least one of the first and second valve seats.

3. The exhaust gas re-circulation valve according to claim 1, wherein at least one of the first and second valve seats has a deformable member which abuts deformably with the valve when at least one of the first and second valves abuts.

4. The exhaust gas re-circulation valve according to claim 3, wherein the deformable member undergoes elastic deformation.

5. An exhaust gas re-circulation valve comprising:
a valve housing having an inlet and an outlet for exhaust gas which is connectable with the engine exhaust gas re-circulation passage and which forms, on the inlet side, a first side passage and a second side passage which branches from the first side passage,
first and second passage apertures formed in the branching connecting part of the first and second side passages,
first and second valve seats provided in the first and second passage apertures,
a valve shaft mounted movably in the axial direction of the valve housing,
first and second valves disposed on the valve shaft and closing in abutment with the first and second valve seats when the valve shaft moves in one direction,
wherein a degree of press fitting of at least one of the first valve seat or the first valve is adjustable so that the distance between the first and second valve seats is equal to that between the first and second valves.

6. The exhaust gas re-circulation valve according to claim 5, wherein the first valve seat is secured by press fitting to the first passage aperture, and
wherein a gap for adjusting the degree of pressure fitting of the valve seat is provided between a first affixing element on an upper edge of the first passage aperture and the first valve seat.

7. The exhaust gas re-circulation valve according to claim 5, wherein the first valve is press fitted into a valve insertion element of the valve shaft, and wherein a gap for adjusting the degree of press fitting of the first valve is provided between a stopper of the valve shaft and the first valve.

8. A method for assembling an exhaust gas re-circulation valve comprising the steps of:

mounting a first valve and a second valve onto a valve shaft at a predetermined distance from each other;

inserting a first valve seat into a first aperture of a valve housing;

inserting a second valve seat into a second aperture of the valve housing;

inserting the valve shaft into the valve housing so that the first valve is placed in abutment with the first valve seat;

and adjusting the positioning of the second valve seat so as to abut with the second valve.

9. The method of assembling an exhaust gas re-circulation valve according to claim 8, wherein the step of mounting the first and second valves includes press fitting and fixing the first and second valves onto the valve shaft by caulking.

10. The method of assembling an exhaust gas re-circulation valve according to claim 8, wherein the step of inserting the first valve seat includes press fitting the first valve seat in the second aperture and fixing the first valve seat to the valve housing by caulking.

11. The method of assembling an exhaust gas re-circulation valve according to claim 8, wherein the step of adjusting placement of the second valve seat includes press fitting the second valve seat in the second aperture so as to abut with the second valve, and fixing the first valve seat to the valve housing by caulking.

12. The method for assembling an exhaust gas re-circulation valve according to claim 8, wherein the second valve seat is inserted so as to leave a gap between the second valve seat and a second affixing element of the valve housing.

13. A method for assembling an exhaust gas re-circulation valve comprising the steps of:

mounting a first valve and a second valve onto a valve shaft at a predetermined distance from each other;

inserting a first valve seat and a second valve seat into a first aperture and second aperture, respectively, of a valve housing, said first valve seat having a deformable member for abutting deformably with the first valve;

and mounting the valve shaft in the valve housing.

14. The method of assembling an exhaust gas re-circulation valve according to claim 13, wherein the first and second valves are press fitted and fixed to the valve shaft by caulking.

15. The method of assembling an exhaust gas re-circulation valve according to claim 13, wherein the first and second valve seats are press fitted in the first and second apertures and fixed to the valve housing by caulking.

16. The method of assembling an exhaust gas re-circulation valve according to claim 13, wherein the deformable member undergoes elastic deformation.

17. A method for assembling an exhaust gas re-circulation valve comprising the steps of:

mounting a first valve onto a valve shaft so as to leave a gap between the first valve and a first stopper on the valve shaft;

mounting a second valve onto the valve shaft in abutment with a second stopper on the valve shaft;

inserting a first valve seat and a second valve seat into a first aperture and second aperture, respectively, of a valve housing;

inserting the valve shaft into the valve housing so that the second valve is placed in abutment with the second valve seat;

and adjusting the placement of the first valve so as to abut with the first valve seat.

18. The method of assembling an exhaust gas re-circulation valve according to claim 17, wherein the step of inserting the first and second valve seat includes press fitting the first and second valve seats in the first and second aperture and fixing the first and second valve seats to the valve housing by caulking.

19. The method of assembling an exhaust gas re-circulation valve according to claim 17, wherein the step of mounting the second valve includes press fitting and fixing the second valve onto the valve shaft by caulking.

20. The method of assembling an exhaust gas re-circulation valve according to claim 17, wherein the step of adjusting placement of the first valve includes press fitting the first valve seat onto the valve shaft so as to abut with the first valve seat, and fixing the first valve seat onto the valve shaft by caulking.

21. A method for assembling an exhaust gas re-circulation valve comprising the steps of:

mounting a first valve and second valve onto a valve shaft at a predetermined distance from each other;

inserting a case formed by material having the same rate of thermal expansion as the valve shaft within a valve housing inserting a first valve seat and a second valve seat into a first aperture and second aperture, respectively, of the case;

and mounting the valve shaft in the valve housing, wherein the case communicates with first and second side passages of the valve housing.

22. The method of assembling an exhaust gas re-circulation valve according to claim 21, wherein the first and second valve seats are press fitted in the first and second apertures and fixed to the case by caulking.

* * * * *